Sept. 8, 1970  R. F. BOERSMA  3,527,474
PIVOTALLY MOUNTED TRACTOR ROLL BAR
Filed Feb. 19, 1969  3 Sheets-Sheet 1

INVENTOR.
R. F. BOERSMA
BY
ATTORNEY

Sept. 8, 1970     R. F. BOERSMA     3,527,474
PIVOTALLY MOUNTED TRACTOR ROLL BAR
Filed Feb. 19, 1969     3 Sheets-Sheet 2
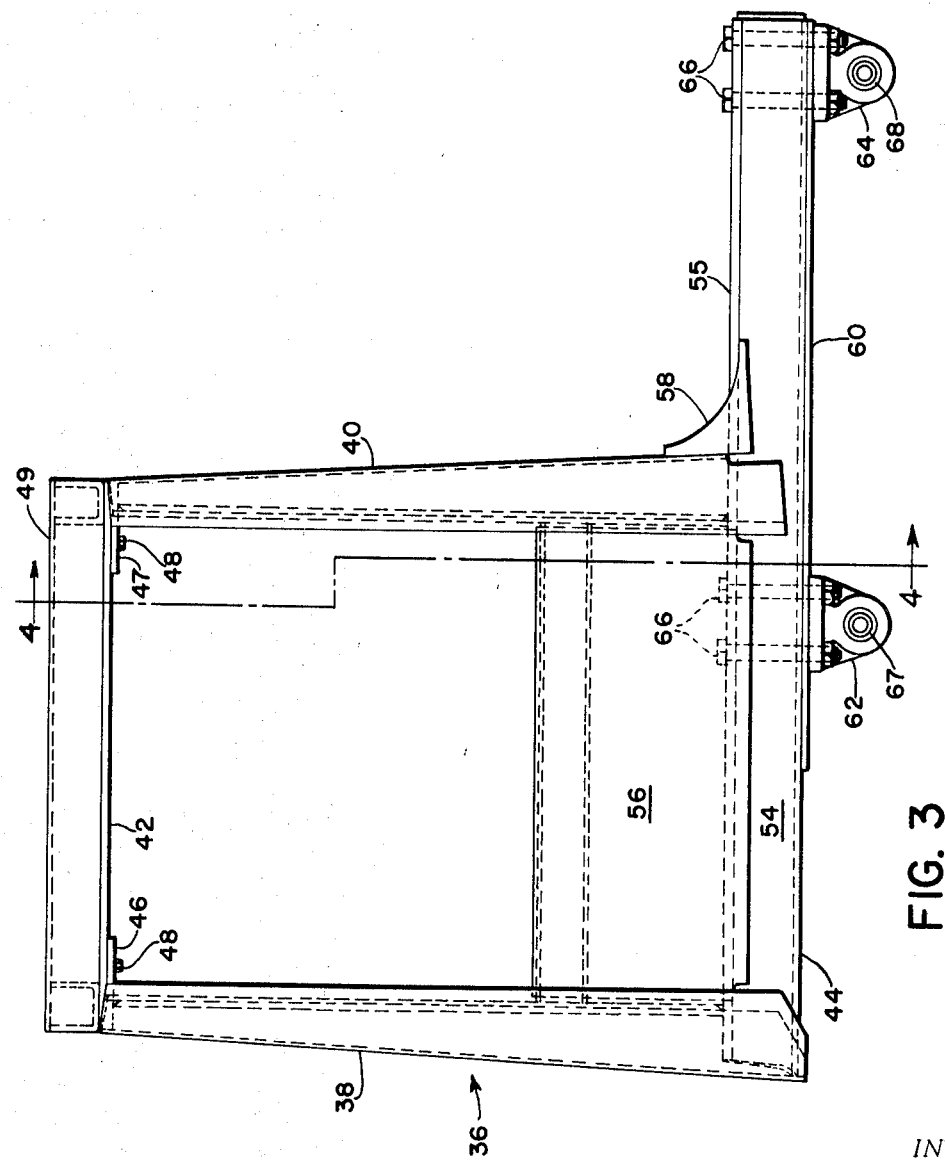
INVENTOR.
R. F. BOERSMA
BY *Jerome R. Oaks*
ATTORNEY Sept. 8, 1970  R. F. BOERSMA  3,527,474
PIVOTALLY MOUNTED TRACTOR ROLL BAR
Filed Feb. 19, 1969  3 Sheets-Sheet 3

INVENTOR.
R. F. BOERSMA
BY Jimmie R. Oaks

ATTORNEY

United States Patent Office 3,527,474
Patented Sept. 8, 1970

3,527,474
PIVOTALLY MOUNTED TRACTOR ROLL BAR
Richard Fred Boersma, Moline, Ill., assignor to Deere & Company, Moline, Ill., a corporation of Delaware
Filed Feb. 19, 1969, Ser. No. 800,483
Int. Cl. B60r 21/02
U.S. Cl. 280—150                                11 Claims

ABSTRACT OF THE DISCLOSURE

A tractor roll bar which includes a pair of transversely spaced upright posts connected at their tops and bottoms by beams and wherein a pair of longitudinally extending pivotal connections are offset from imaginary vertical extensions of the posts and connect the bottom beam of the roll bar to the main frame of the tractor. Two forms of roll bars are disclosed, one form is connected to a tractor which has the operator station centered with respect to the main support frame and has a bottom beam which extends only from one post to the other post and is centered directly behind the operator station and the other form is connected to a tractor which has the operator's station offset laterally from the main support frame and has a bottom beam which extends laterally beyond one of the posts and is connected to the tractor main frame and supports the post directly behind and in centered relationship to the operator's station.

BACKGROUND OF THE INVENTION

The present invention relates to a tractor roll bar and more specifically relates to a roll bar which includes a pair of laterally spaced upright posts connected at their tops and bottoms by beams and wherein pivotal connections are provided on the bottom beam at locations offset from imaginary vertical extensions of the posts for connecting the roll bar to the main frame of the tractor.

It is known to provide tractors with roll bars for protecting the tractor operator in case of a rollover. Many roll bar structures include a pair of upright laterally spaced posts, the tops of which are interconnected by a member and the bottoms of which are rigidly connected to the tractor frame. Such construction is shown in Pat. No. 3,146,001 granted to McFadyen on Aug. 25, 1964 and in Pat. No. 3,402,941 granted to Martinmaas on Sept. 24, 1968. Tractor roll bars of the above-noted construction have been found to be unsatisfactory in that the roll bars do not absorb enough energy during a rollover since the upright posts tend to break away from their connections to the tractor. Further, these roll bars are not adaptable to be used on tractors having the operator's station offset from the main frame of the tractor.

SUMMARY OF THE INVENTION

According to the present invention, there is provided a tractor roll bar which is constructed and mounted on the tractor in such a way as to absorb substantial amounts of energy in case of a tractor rollover and as to be adaptable for mounting to tractors having the operator's station offset from the main frame of the tractor.

More specifically, it is an object to provide a pair of laterally spaced upright posts which are interconnected at their tops and bottoms by beams.

Another object is to provide a pair of pivotal connections on the bottom beam spaced from imaginary extensions of the post for connecting the roll bar to the main frame of the tractor.

A further object is to provide two forms of roll bars, one form for use with tractors having the operator station in centered relationship to the main frame of the tractor and having the bottom beam extending only from one of the posts to the other and the other form for use with tractors having the operator's station offset from the main frame of the tractor and having the bottom beam extending laterally beyond one of the upright posts for connection to the tractor main frame.

Still a further object is to provide the pivot connections with rubber inserts for absorbing energy and dampening noise.

These and other objects will become apparent from the specification and accompanying drawings.

BRIEF DESCRIPTION OF THE DRAWINGS

FIG. 3 is a view similar to FIG. 2 but showing the roll bar removed from the tractor frame and enlarged;

FIG. 4 is a sectional taken along the line 4—4 of FIG 3;

DESCRIPTION OF THE PREFERRED EMBODIMENT

Figure 1:
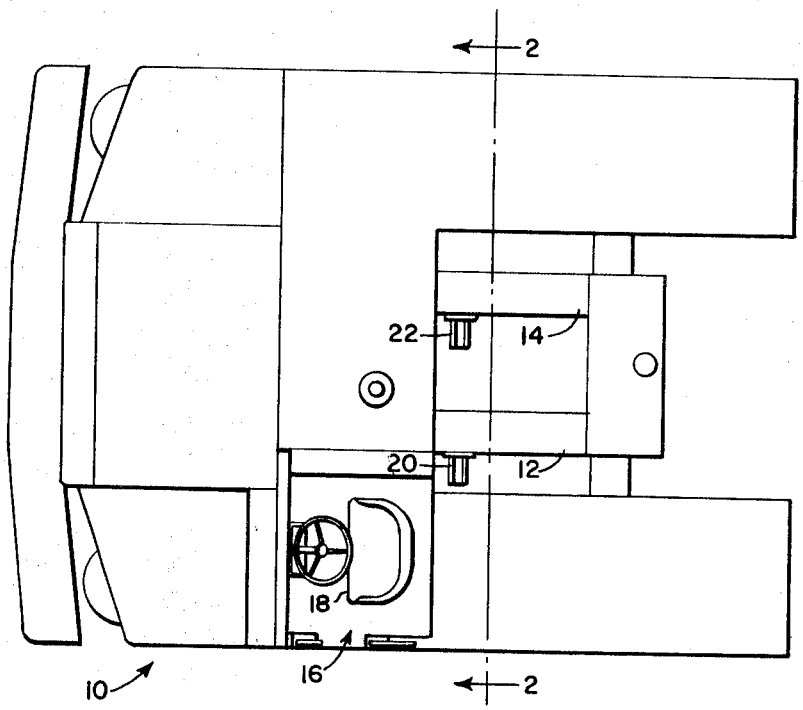
FIG. 1 is a top view of a tractor of the type having the operator's station offset with respect to the main frame and shows the brackets to which the roll bar is to be fastened.
Figure 2:
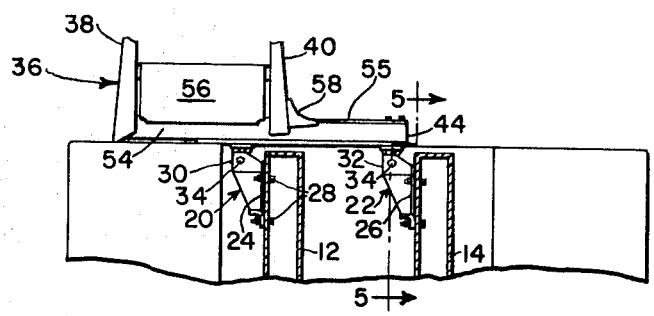
FIG. 2 is a sectional taken along line 2—2 on FIG. 1 showing the roll bar fastened to the brackets.
Figure 5:
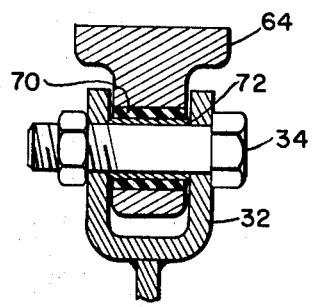
FIG. 5 is a sectional taken along line 5—5 of FIG. 2.

One form of the invention is for use with a tractor of the type illustrated in FIG. 1, which tractor is generally designated by the numeral 10. The tractor 10 is for powering earthmoving equipment such as scrapers and includes left and right fore-and-aft extending main frame beams 12, 14 (as determined facing toward the front of the tractor) which are supported on front and rear pairs of wheels (not shown). An operator's station 16 is positioned laterally outwardly of the left beam 12 and includes a seat 18. Supported on the left face of each of the beams 12, 14 is a respective one of a pair of roll bar connection brackets 20, 22 which are located in a common vertical plane extending laterally behind the operator's station 16. The brackets 20, 22 each include a respective plate portion 24, 26 fastened to the beams 12, 14 by means of bolts 28 and each bracket includes respective U-shaped portions 30, 32 which are apertured for receiving fore-and-aft extending pivot bolts 34.

A roll bar 36 is connected to the brackets 20, 22 and includes left and right generally upright posts 38, 40 which are tapered from the bottom to the top and are respectively positioned to the left and right of the seat 18. The tops and bottoms of the posts 38, 40 are respectively interconnected by means of a plate 42 and a beam 44. A pair of apertured members 46, 47 are welded to the respective tops of the posts 38, 40 and the plate 42, and is apertured at its opposite ends for receiving bolts 48 which provide connections for a rectangular member 49 which forms the rear portion of a generally rectangular frame for supporting the top of an operator's cab (not shown). The beam 44 is welded at the bottoms of the posts 38, 40 and extends beyond the post 40 to a position above the bracket 22. The beam 44 includes an upwardly opening channel portion 50 having a bight 51 joining opposite sides 52, 54, and a plate 55 bridging the tops of the sides 52, 54.

The weld connections between the post 38, 40 and the beam 44 are reinforced by a member 56 which is positioned between the posts 38, 40 and is welded at its bottom to the side 54 of the beam 44 and is welded along its opposite ends to the posts 38, 40. Further reinforcement is provided by a gusset 58 which is welded in the corner formed by the right surface of the post 40 and the beam 44.

A bearing plate 60 extends from a location substantially midway between the posts 38, 40 to the right end of the beam 44 and underlies the bight 51 of the beam 44. The bearing plate 60 and a pair of lugs 62, 64 are fastened to the beam 44 by bolts 66 which extend through four apertures formed in each of the lugs 62, 64 and through matching sets of apertures formed in the bearing plate 60 and beam 44 at respective locations slightly to the left of the right post 40 and at the right end of the beam 44. Respective fore-and-aft extending apertures 67, 68 are formed in the lugs 62, 64 and the apertures 67, 68 each carry a sleeve-like rubber insert 70 each of which in turn carry a metal bushing 72. The lugs 62, 64 are positioned in a respective one of the U-shaped bracket portions 30, 32 and are retained therein by the pivot bolts 34.

Figure 6:
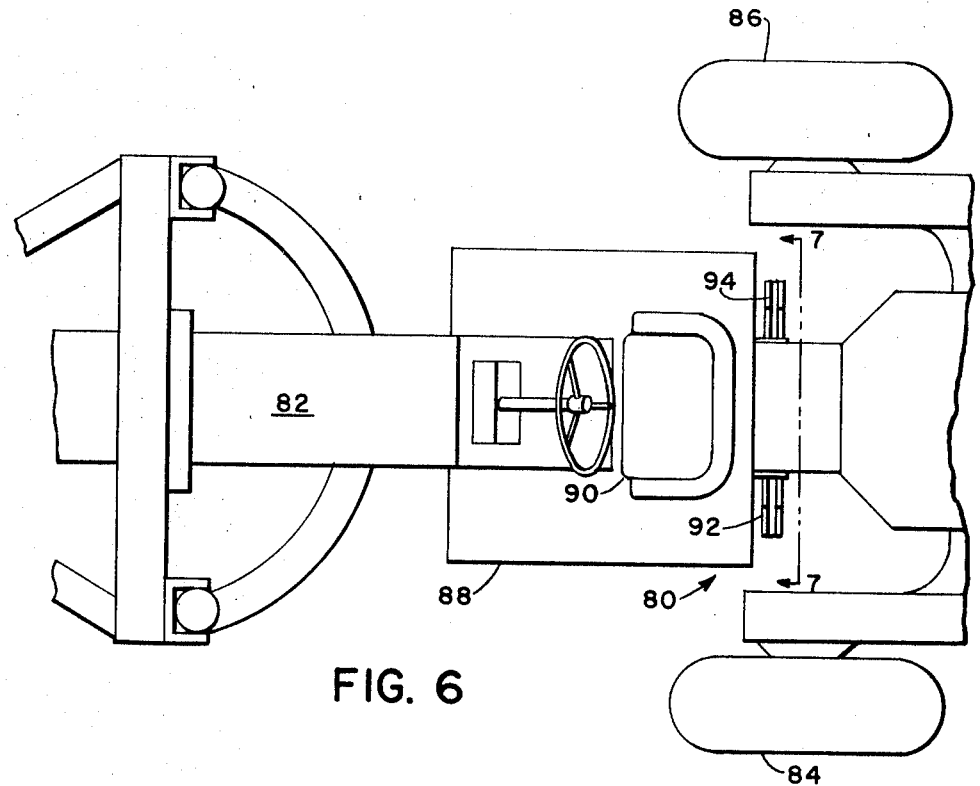
FIG. 6 is a top view of a tractor of the type having the operator's station centered with respect to the main frame of the tractor and shows the brackets to which the roll bar is to be fastened.
Figure 7:
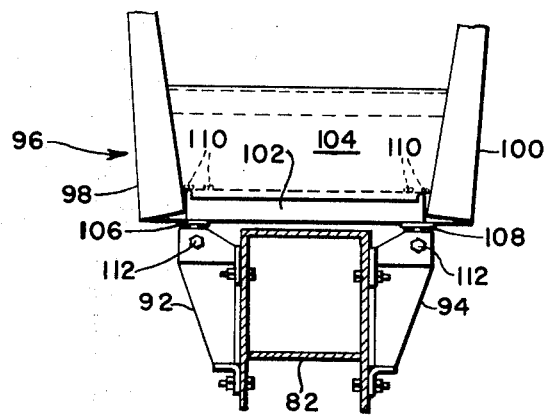
FIG. 7 is a sectional taken along line 7—7 of FIG. 6 but showing the roll bar fastened to the brackets.

The second form of the invention is for use with tractors of the type illustrated in FIG. 6 and designated generally by the numeral 80. The tractor 80 supplies power for a motor grader which includes a main frame 82 which is supported at the rear by two pairs of wheels, only one set 84, 86 being shown, and at the front by another pair of wheels (not shown). An operator's station 88 is supported by and positioned in centered relationship to the main frame 82 and includes a seat 90. Supported on the opposite side of the main frame 82 at a location directly behind the seat 90 are a pair of oppositely disposed brackets 92, 94 which are of a construction similar to the brackets 20, 22 described in detail in conjunction with the description of the first form of the invention given above.

A roll bar 96 is connected to the brackets 92, 94 and includes a pair of laterally spaced, generally upright posts 98, 100 which are tapered from the bottom to the top similar to the construction of the posts 38, 40 of the first described form. The top of the roll bar 96 is not shown, however, it is constructed similarly to the top of the roll bar 36. The bottoms of the upright posts 98, 100 are welded to and interconnected by a bottom beam 102 which is of similar construction to the beam 44 and which extends only between the posts 98, 100 and a reinforcing member 104 similar to the member 56 extends between the posts 98, 100.

A pair of lugs 106, 108 similar in construction to the lugs 62, 64 are connected to the beam 102 at locations inwardly from the posts 98, 100 by vertically extending bolts 110 and are received in the U-shaped portion of the brackets 92, 94 and are held therein by fore-and-aft extending pivot bolts 112.

In operation of the first form of roll bar, if the tractor 10 should roll over to the left, force resulting from contact with the ground will be applied to the upper portion of the left post 38. This force will cause the roll bar to tend to pivot about the fore-and-aft pivot bolt 34 connecting the roll bar to the bracket 20. Since the left end of the beam 44 is free to move upwardly, it will do so and force will be exerted downwardly through the post 40 to cause the beam 44 to bend in between the pivot connections to the brackets 20, 22. Since the posts 38, 40 are tapered, they will tend to bend at the top before bending at the bottom thus absorbing energy to keep the welded connection to the beam 44 from becoming unduly stressed. The tendency of the heads of the bolts 66 to pull through the apertures from the beam 44 is lessened because the plate 55 and the channel portion 50 deform before forces great enough to tear the apertures are encountered. The operation of the second form of the roll bar is generally similar to that of the first form, that is to say, a rollover to the left will result in a force being applied to the upper portion of the upright 98 causing the upright posts 98, 99 to bend toward the right and causing that portion of the beam 102 to the left of the left pivot to bend upwardly and that portion of the beam 102 to the right of the right pivot to bend downwardly while that portion of the beam in between the pivots also bends downwardly. Thus, it can be seen that all the members of the roll bar absorb energy by bending gradually throughout their length.

While the preferred embodiment of the invention has been shown and described, it will be apparent that variations and modifications thereof may be made without departing from underlying principles thereof.

What is claimed is:

1. A tractor having a centrally located fore-and-aft extending main frame and an operator's station and provided with a roll bar assembly comprising a pair of transversely spaced posts positioned rearwardly of and at respective sides of the operator's station, transversely extending bottom beam means interconnecting the bottoms of the posts, top beam means interconnecting the tops of the posts, and means connecting the bottom beam means of the roll bar to the main frame of the tractor at positions laterally offset from the junctures of said posts with said bottom beam means.

2. The invention as set forth in claim 1 wherein the means connecting the roll bar to the main frame of the tractor comprises a first pair of laterally spaced lugs connected to the bottom beam means and each lug having a fore-and-aft extending aperture formed therein, a second pair of laterally spaced lugs positioned adjacent the respective one of said pair of lugs and connected to the main frame of the tractor, and each of said second pair of lugs having a fore-and-aft extending aperture formed therein in axial alignment with apertures forming said first pair of lugs and a pivot pin extending to the axially aligned apertures of said first and second pairs of lugs.

3. The invention as set forth in claim 2 wherein the apertures of the first pair of lugs each have a sleeve-like rubber insert positioned therein and a metal bushing being positioned in each of the rubber inserts receiving a respective one of the pivot pins.

4. The invention as set forth in claim 1 wherein the operator's station is positioned in centered relationship to and above the main frame of the tractor and wherein the means connecting the roll bar to the main frame of the tractor are connected to the bottom of said bottom beam at locations intermediate said upright posts.

5. The invention as set forth in claim 1 wherein said posts each taper from their bottoms to their tops.

6. The invention as set forth in claim 1 wherein said bottom beam means comprises an upwardly opening U-shaped channel having a lower bight and upwardly extending sides, an elongated plate extending the length of the channel and overlying the sides, said plate and bight having a plurality of vertically aligned apertures and said means connecting the roll bar to the main frame of the tractor including a pair of brackets having apertures registrable with the vertically aligned apertures and a plurality of bolts extending through the apertures for connecting said brackets to the bight of the main beam.

7. The invention as set forth in claim 4 wherein the means connecting the roll bar to the main frame of the tractor comprises a pair of brackets each being constructed of two portions, one portion being connected to the bottom beam and the other portion being connected to said main frame of the tractor and said two portions being pivotally interconnected by a fore-and-aft extending pivot pin.

8. The invention as set forth in claim 1 wherein said operator's station is offset laterally to one side of the main frame of the tractor and wherein the bottom beam means extends laterally beyond the post which is located nearest the center of the tractor to a location adjacent the other side of the main frame and wherein the means connecting the roll bar to the main frame comprises a first bracket interconnecting that portion of the bottom beam located between the upright post to the main frame of the tractor and a second bracket interconnecting the ends of that portion of the beam extending laterally beyond said post located nearest the center of the tractor to the main frame of the tractor.

9. In a tractor having a centrally located fore-and-aft extending center line and fore-and-aft extending main frame with portions thereof on opposite sides of the center line and an operator's station offset to one side of the center line, the improvement residing in a roll bar assembly comprising: a pair of transversely spaced inner and outer posts positioned at the rear of and at respective inner and outer sides of the operator's station, top beam means interconnecting the tops of the posts, and a bottom beam structure interconnecting the bottoms of said post and having an outer portion extending inwardly from the base of the outer post to the base of the inner post and having an inwardly projecting portion extending from the base of the inner post inwardly across the fore-and-aft center line, and means connecting the bottom beam structure to the respective portions of the main frame on opposite sides of the fore-and-aft center line.

10. The invention as defined in claim 9 wherein the means connecting the bottom beam structure to the main frame comprises an inner connection means located adjacent the inner end of the inwardly extending portion of the bottom beam structure and an outer connection means located outwardly of and adjacent to the inner post whereby the portion of the beam outwardly of the outer connection is cantilever supported.

11. The invention as defined in claim 10 wherein the inner and outer connection means each include a fore-and-aft extending pivot.

References Cited

UNITED STATES PATENTS

| | | | |
|---|---|---|---|
| 2,729,462 | 1/1956 | Maybrier | 280—150 |
| 3,402,941 | 9/1968 | Martinmaas | 280—150 |
| 3,450,430 | 6/1969 | Wendt et al. | 280—150 |
| 3,455,598 | 7/1969 | Tweedy et al. | 296—102 |

LEO FRIAGLIA, Primary Examiner

R. R. SONG, Assistant Examiner

U.S. Cl. X.R.

296—102